United States Patent [19]

Asada et al.

[11] 4,418,391

[45] Nov. 29, 1983

[54] METHOD OF INSPECTING OPERATION OF DRIVING SYSTEM INCLUDING A MAIN MACHINE AND A PLURALITY OF AUXILIARY MACHINES, AND DRIVING SYSTEM INCORPORATING INSPECTION APPARATUS FOR CARRYING OUT THE INSPECTION METHOD

[75] Inventors: Yoshikatsu Asada; Shunji Mori, both of Hitachi, Japan

[73] Assignee: Hitachi, Ltd., Tokyo, Japan

[21] Appl. No.: 193,444

[22] Filed: Oct. 3, 1980

[30] Foreign Application Priority Data

Oct. 5, 1979 [JP] Japan ............................... 54-127955

[51] Int. Cl.$^3$ ............................................ G06F 11/30

[52] U.S. Cl. .................................... 364/551; 364/186; 371/20

[58] Field of Search ........................ 364/186, 551, 184; 371/20, 29

[56] References Cited

U.S. PATENT DOCUMENTS

| | | | |
|---|---|---|---|
| 3,829,842 | 8/1974 | Langdon et al. | 364/186 X |
| 4,133,477 | 1/1979 | Marino et al. | 371/20 |
| 4,162,396 | 7/1979 | Howard et al. | 371/20 |
| 4,298,955 | 11/1981 | Munday et al. | 364/186 X |

*Primary Examiner*—Jerry Smith

*Attorney, Agent, or Firm*—Antonelli, Terry & Wands

[57] ABSTRACT

Provided is a daily inspection process for making a daily inspection of a driving system having a main machine and a plurality of auxiliary machines. The driving system is so constructed that the main machine is started only after a plurality of starting conditions including correct functioning of the auxiliary machines are fulfilled. According to the inspection process of the invention, the plurality of starting condition are inspected sequentially in such a manner that, when the failure in one of the starting conditions is detected, the inspection proceeds to the next step after locking the main machine against the start up, so that the plurality of starting conditions are checked sequentially without suspension, whereby all of the failed conditions are detected in a single inspection operation.

8 Claims, 3 Drawing Figures

METHOD OF INSPECTING OPERATION OF DRIVING SYSTEM INCLUDING A MAIN MACHINE AND A PLURALITY OF AUXILIARY MACHINES, AND DRIVING SYSTEM INCORPORATING INSPECTION APPARATUS FOR CARRYING OUT THE INSPECTION METHOD

BACKGROUND OF THE INVENTION

The present invention relates to a method of and apparatus for inspecting operations of constituents of a system including a plurality of machines in which the machines are started after successive confirmation of fulfilment of a plurality of driving conditions.

Main machines, such as pumps of water supply plants or sewerage plants, alternators for use in power stations, and the like, have various auxiliary machines. The starting up of such main machine is effected only after the confirmation of fulfilment of a plurality of starting conditions including the safe operations of the auxiliary machines.

In a system incorporating such a main machine, a daily inspection is necessary to confirm the safe operation of the main machine including the auxiliary machines. In such daily inspection (one inspection within every unit time), the main machine is actually started for the purpose of inspection after successive confirmations of fulfilments of a plurality of starting conditions including the safe operations of the auxiliary machines.

According to a conventional method of daily inspection, the inspection is suspended when one of the starting conditions fails to occur and the cause of the failure is investigated. The inspection proceeds to the next step only after the clarification and removal of the cause of the failure. This inspection process does not cause any substantial problem when only one of the starting conditions has failed. However, when more than two starting conditions have failed, it is necessary to take numerous steps such as finding out of the failure of one starting condition, investigation and removal of the cause of the failure, commencement of the daily inspection, finding the failure of another starting condition, investigation and removal of the cause of the failure and the commencement of the daily inspection. This work is considerably troublesome and time consuming, particularly when the central control room where the daily inspection is made is located at a distance from the main machine including the auxiliary machines, because in such a case the operator or the inspector has to go back and forth between the control room and the machine.

SUMMARY OF THE INVENTION

Under these circumstances, the present invention aims as its major object at providing a daily inspection method which can eliminate the above-described problems of the prior art.

The invention provides also an inspection apparatus for use in carrying out the inspection method of the invention.

These and other objects, as well as advantageous features of the invention will become clear from the following description of the preferred embodiment taken in conjunction with the accompanying drawings.

DESCRIPTION OF THE PREFERRED EMBODIMENTS

Figure 2:
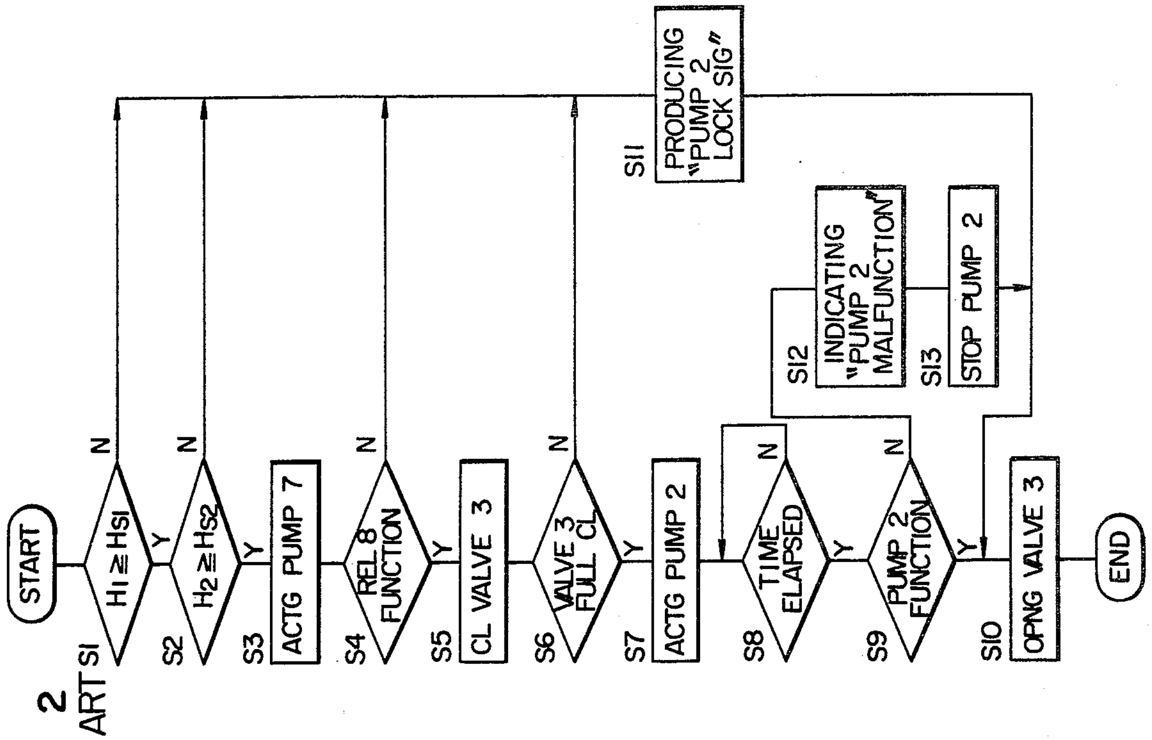
FIG. 2 PRIOR ART
FIG. 2 is a flow chart of a conventional inspection method applied to the driving system as shown in FIG. 1.

Referring to the drawings, reference numerals 1, 2 and 3 denote, respectively, a water well, a pump and a solenoid-actuated discharge valve. The water level in the water well is detected by a water level detector 4, while the opening degree of the discharge valve 3 is detected by a detector 5. A reference numeral 6 denotes a cooling water tank, while 7 designates a cooling water pump. Numerals 8 and 9 denote, respectively, a flow relay and a detector for detecting the water level in the cooling water tank 6. A reference numeral 10 designates a computer control unit adapted to control operation of the abovementioned constituents of the driving system, as well as the inspection of the same.

Figure 1:
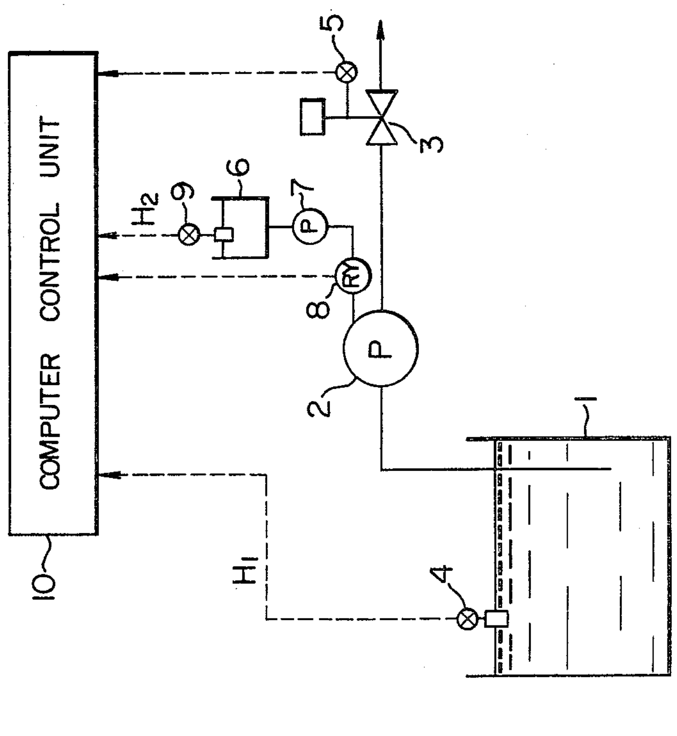
FIG. 1 schematically shows a driving system of a main machine having auxiliary machines to which the daily inspection method of the invention is applied.

In the system shown in FIG. 1, the pump 2 as a main machine sucks the water up from the water well 1 and discharges the same via a solenoid-actuated discharge valve (referred to as "valve", hereinunder). The pump 2 is allowed to start only when all of the following starting conditions are fulfilled.

(1) The water level $H_1$ in the water well 1 is above a predetermined level $H_{s2}$.

(2) The water level $H_2$ in the cooling water tank 6 is above a predetermined level $H_{s2}$.

(3) The cooling water pump 7 operates correctly to supply the pump 2 with cooling water (This can be confirmed by the flow relay 8).

(4) The valve 3 is completely closed.

FIG. 2 shows the flow chart of a conventional inspection method which is usually taken immediately before the actual start up of the driving system.

As a start up command is given, the computer control unit 10 judges at a step S1, upon receipt of a signal from the water level detector 4, whether the water level $H_1$ in the water well 1 is higher than the predetermined level $H_{s1}$ and, after confirming that the actual level $S_1$ is higher than the predetermined level $H_{s1}$, makes a judgement at a step S2 as to whether the water level $H_2$ in the cooling water tank 6 is higher than a predetermined level $H_{s2}$. If the water level $H_2$ is found to be greater than $H_{s2}$, the inspection proceeds to the next step S3 so that the cooling water pump 7 is started. In consequence, the cooling water is supplied from the cooling water tank 6 to the pump 2. In the event that a condition $H_1<H_{s1}$ is found in the step S1 or a condition of $H_2<H_{s2}$ is found in the step 2, the computer control unit 10 takes a step 11 to produce a pump locking signal to stop the pump start up operation in the driving system.

After the start up of the cooling water pump 7 in the step S3, the computer control unit 10 checks for the operation of the flow relay 8. The computer control unit 10 judges that the cooling water is safely supplied by the cooling water pump 7, if the water relay is functioning, so that it produces a command at a step S5 for closing the valve 3. Thereafter, in the next step 6, the computer control unit 10 makes a judgement as to whether the valve 3 has been fully closed, upon receipt of a signal from the valve opening detector 5. If the computer control unit 10 finds the valve 3 completely closed, it starts up the pump 2 at the step S7. If the safe functioning of the flow relay 8 is not confirmed at the step S4, or when the valve 3 is found not completely closed at the step S6, the inspection proceeds to the step 11 so that a pump locking signal is issued to lock the pump thereby to stop the pump start up operation of the driving system.

Elapse of a predetermined time length after start up of the pump at the step S7 is judged at a step S8 and the safe operation or functioning of the pump 2 is confirmed at a step S9. If the safe operation of the pump 2 is confirmed, the discharge valve 3 is fully opened at a step S10 so that the system as a whole turns to the normal operation.

If a malfunctioning of the pump 2 is detected at the step S9, an indication of the malfunctioning of the pump 2 is made at a step S12 and the pump 2 is stopped at a subsequent step S13.

In the illustrated conventional inspection method, the fulfilments of the starting conditions are judged at the steps S1, S2, S4 and S6. If one of these starting conditions is failed, the driving system stops the pump start up operation at the instant of detection of such a failure. Therefore, in the conventional inspection method, only one failure can be detected at a time, in the event where two or more starting conditions are failed. Namely, assuming here that the starting condition of $H_1 \geqq H_2$ is failed at the step S1, the pump start up operation is suspended at that step so that it is not possible to detect the failure in the fulfilment of the starting condition in the subsequent steps, e.g. the condition of $H_1 \geqq H_2$ at the step S2 and the condition of safe functioning of the flow relay 8 in the step S4. Namely, for confirming the filfilments of the starting conditions which are to be confirmed at the steps S2, S4 and S6, it is necessary to repeat the inspection operation after the removal of the cause of the failure of the starting condition detected at the step S1. This work is extremely troublesome and time consuming. Since usually there is a long distance between the place where the driving system is installed and the control panel of the driving system, the efficiency in the inspection would be improved if the operator could know the failures in two or more starting conditions simultaneously and take necessary measure at the machine side for removing the causes of such failures at a time.

From this point of view, the present invention aims at providing an inspection method which permits a simultaneous detection of failures in two or more starting conditions by only one inspection operation.

Figure 3:
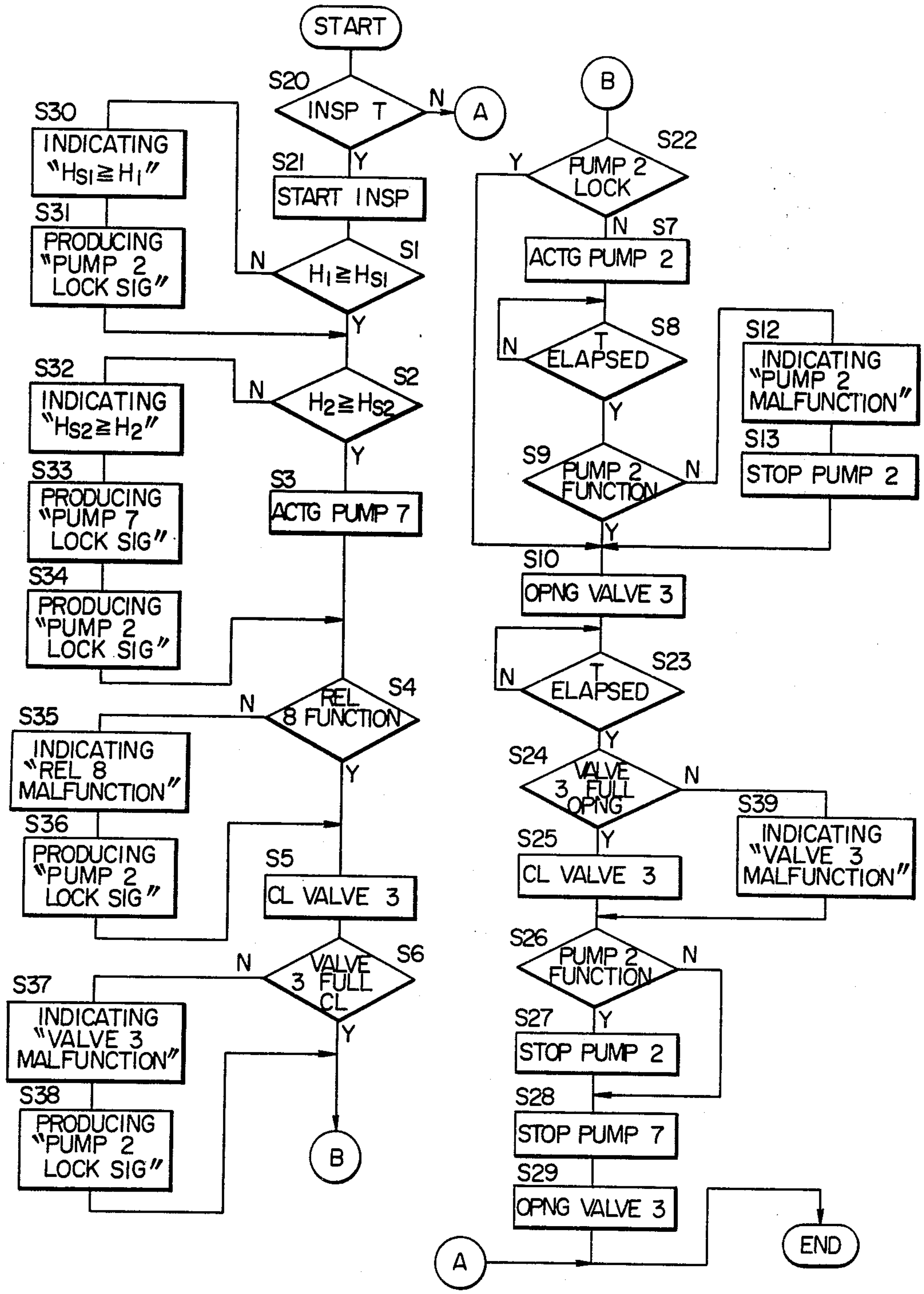
FIG. 3 is a flow chart of the inspection method in accordance with the invention applied to the driving system shown in FIG. 1.

FIG. 3 shows a flow chart of an inspection method of the invention applied to the driving system illustrated in FIG. 1. In FIG. 3, the same step numbers are used to represent the same judgements or operations as those of FIG. 2.

The inspection system shown in FIG. 3 is a daily inspection system which is automatically put into operation at a predetermined time everyday. The computer control unit 10 delivers at a step S21 an inspection start command, upon detection of the inspection time at a preceding step S20. In consequence, steps S1 thru S6 are successively conducted and, if the conditions of these steps are met, the pump 2 is started at the step S7.

Thereafter, the valve 3 is fully opened at the step 10 and the safe operation of the pump 2 is confirmed. The above-explained sequence is identical to that performed in the inspection method shown in FIG. 2 when all of the plurality of starting conditions are fulfilled.

In the event that the failure of the condition $H_1 \geqq H_{s1}$ is detected in the first step $S_1$, i.e. when a condition $H_1 < H_{s1}$ is found at the step S1, the computer control unit 10 conducts the operation of the step S30 to make an indication of the fact that the actual water level $H_1$ in the water well 1 is below the predetermined level $H_{s1}$, and produces at a step S31 a signal for locking the pump 2 against starting. The computer control unit 10 then conducts the operation of the step S2 and, if the condition of $H_2 < H_{s2}$ is detected, turns to the operation of a step S32 to indicate that the actual water level $H_2$ in the cooling water tank 6 is below $H_{s2}$. The computer control unit 10 then produces at a subsequent step S33 a signal for locking the cooling water pump against the start up thereof and, at a subsequent step S34, a signal for locking the pump 2 against the start up thereof. The computer control unit 10 then conducts the operation of the step S4 to check the functioning of the flow relay 8. If the flow relay 8 is not functioning, an indication of malfunctioning of the flow relay is made at a steps 35 and, after a generation of a pump locking signal in the subsequent step S36, the step S5 is conducted in which the valve 3 is closed and the full closing of the valve 3 is judged by the subsequent step S6. If the valve 3 is not fully closed, the malfunctioning of the valve 3 is indicated in the step S37 and a pump locking signal is generated in the subsequent step S38 while permitting the step S22 to be conducted. In the step S22, it is judged whether the pump locking signal is produced or not and, if no pump locking signal is confirmed, the pump 2 is started at the step S7. If there is any pump locking signal, the inspection process skips to the step S10 to open the valve 3.

It will be seen that, in the inspection method of the invention, the inspection process proceeds successively without suspension even after the detection of failure in fulfilments of one or more starting conditions. Therefore, it is possible to confirm the states of machines and a plurality of driving conditions by only one inspection operation, so that the inspection can be completed at a higher efficiency in a shorter time.

According to the invention, furthermore, the failure of fulfilment of a starting condition or conditions is displayed for each item and the pump locking signal is generated at each time of the detection of failure in fulfilment of the starting condition. It is, therefore, possible to judge whether the pump 2 should be started or not by simply discriminating the presence of the pump locking signal, without requiring repetitional and sequential checking of a plurality of starting conditions. This further improves the efficiency of the inspection work.

The inspection operation in accordance with the inspection method of the invention is stopped in a manner explained hereinbelow.

The valve 3 is opened at a step S10 and the elapse of a predetermined time is confirmed at a step S23. Then, the state of the valve 3 is checked at the subsequent step S24. If the valve 3 is fully opened, the step S25 is conducted to close the valve 3. On the contrary, if the valve 3 is not fully opened, the step S29 is conducted to indicate the malfunctioning of the valve 3 and the subsequent step S26 is conducted. In the step S26, a judgement is made as to whether the pump 2 is functioning correctly and, in the event that the safe operation of the pump 2 is confirmed, the subsequent step S27 is conducted to stop the pump 2. Thereafter, the stopping of the cooling water pump 7 and the opening of the valve 3 are made in the subsequent steps S28 and S29, thereby to complete the inspection operation.

In the inspection method stated above, the step S28 performs only the stopping of the cooling water pump, although there is a possibility that the cooling water pump 7 is locked against start up. This is because the pump 7 is a so-called auxiliary machine and a mere stopping operation is sufficient.

Although the invention has been described through its preferred form, the described embodiment is not exclusive and various changes and modifications may be imparted thereto without departing from the scope of the invention which is limited by the appended claims. For instance, the invention can equally be applied to various driving systems in which the main machines are alternators, engines or compressors, not only to the described driving system having a pump as the main machine.

What is claimed is:

1. A method of inspecting at set time intervals a driving system having a main machine and a plurality of auxiliary machines, said main machine being so controlled as to be started only when the function of every auxiliary machine is satisfactory, said method including the steps of:

i. sequentially checking the function of all of said auxiliary machines without interruption to detect a malfunction of any auxiliary machine, in response to which an indication of a malfunction of said auxiliary machine is produced and a main machine locking signal is produced;

ii. checking the function of said main machine if said main machine locking signal is not generated; and then iii. correcting any malfunction in an auxiliary and the main machine.

2. A driving system including a main machine, a plurality of auxiliary machines and a control means for, prior to start-up, sequentially checking the function of all of said auxiliary machines without interruption, and each time a malfunction of an auxiliary machine is detected, for producing an indication of a malfunction of said auxiliary machine and a main machine locking signal, said control means including means for starting said main machine if said main machine locking signal is not generated.

3. A driving system as set forth in claim 2, wherein said control means further includes means for checking the function of every auxiliary machine every day at a predetermined time.

4. A driving system as set forth in claim 3, wherein said main machine is a pump for sucking and discharging water from a water well.

5. A method of inspecting at set time intervals a driving system having a main machine and a plurality of auxiliary machines, said main machine being so controlled as to be started only when the function of every auxiliary machine is satisfactory, said method including the steps of:

i. sequentially operating all of said auxiliary machines without interruption to check the function of each auxiliary machine to detect a malfunction of any auxiliary machine, and producing an indication of a malfunction of each of said malfunctioning auxiliary machines in response to each detection of malfunction and a main machine lockout signal when a malfunction is detected in any auxiliary machine;

ii. checking the function of said main machine if said main machine lockout signal is not generated; and then iii. correcting any malfunction in each malfunctioning auxiliary machine and any malfunction in the main machine.

6. A driving system including a main machine, a plurality of auxiliary machines and a control means for, prior to start-up, sequentially operating all of said auxiliary machines without interruption to check the function of each auxiliary machine, and each time a malfunction of an auxiliary machine is detected, producing an indication of a malfunction of each of said malfunctioning auxiliary machines in response to each detection of a malfunction and a main machine lockout signal when a malfunction is detected in any auxiliary machine, said control means including means for starting said main machine if said main machine lockout signal is not generated.

7. A driving system as set forth in claim 6, wherein said control means further includes means for checking the function of each auxiliary machine every day at a predetermined time.

8. A driving system as set forth in claim 6, wherein said main machine is a pump for sucking and discharging water from a water well.

* * * * *